Feb. 8, 1955 P. G. VIRONDA 2,701,427
FISHLINE SINKER
Filed March 28, 1949
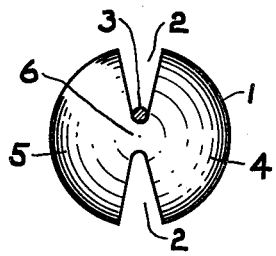
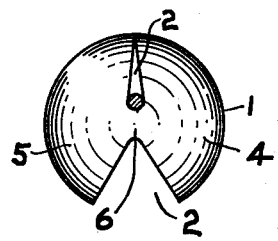
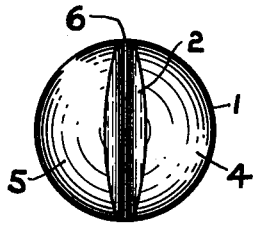
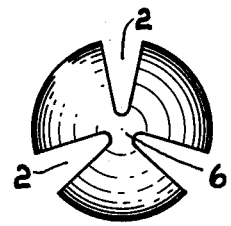
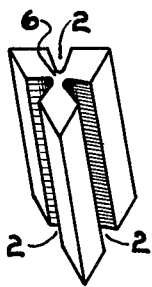
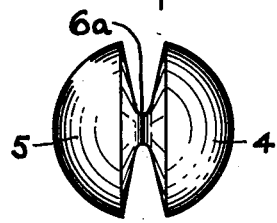
INVENTOR
Philip G. Vironda
BY Roy A. Plant
ATTORNEY

2,701,427

FISHLINE SINKER

Philip G. Vironda, Battle Creek, Mich., assignor to Italo D. Vironda, Battle Creek, Mich.

Application March 28, 1949, Serial No. 83,971

3 Claims. (Cl. 43—44.89)

The present invention relates broadly to anchorable weights, and in its specific phases to sinkers suitable for fastening on fishlines.

Fishline sinkers have been produced and used in many forms with perhaps the most common one being of substantially elongated elliptical form with wire eyes at the ends for fastening to the fishline. Single slotted shot sinkers have been used for both trout and still fishing, but those sinkers require the use of pliers or pounding tools to bend the lips together for anchoring to a fishline. Moreover, to get them off the line calls for a sharp-edged tool, such as a knife, to spread the lips of the slot. This is too slow for trout fishing since there sinkers have to be added where the fishing is in rapid water and have to be quickly removed when relatively still water is reached. It was a recognition of fishermen's needs and the complete lack of rapidly usable shot type sinkers which led to the conception and development of the present invention.

Accordingly among the objects of the present invention is the provision of a simple construction multiple slotted anchorable weight or fishline sinker.

Another object is to provide a quick acting sinker of multiple slot construction which is easy to use and does not require tools to mount or remove the sinker from a fishline or the like.

Another object is to provide an efficient, easily removable, weight or fishline sinker which may be formed in many types, such, for instance, as shot and bar construction.

A further object is to produce an anchorable weight or multiple grooved fishline sinker which is easy to manufacture and relatively inexpensive.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means of carrying out the invention, such disclosed means illustrating, however, but several of the various ways in which the principle of the invention may be used.

In the annexed drawing:

Figure 1 shows an end view of a 2-slotted shot form of the present invention with the fishline ready to be gripped.

Figure 2 shows an end view of the Figure 1 shot with the shot gripped onto the fishline.

Figure 3 shows a bottom view of the shot illustrated in Figure 1.

Figures 4 and 5 show modifications of the Figure 1 construction wherein, respectively, three and four slots are used.

Figure 6 shows a special form of the multi-slotted shot wherein two slots are used and the ends of the slots joined to produce a continuous groove.

Figure 7 shows a cylindrical sinker with a pair of oppositely directed longitudinal slots.

Figure 8 shows an enlongated triangular sinker slotted lengthwise substantially centrally of each face.

Referring more particularly to Figure 1 of the drawing, it will be noted that a shot type of sinker is shown and that such sinker 1 is provided with a pair of oppositely opening slots 2. Each of these slots, as shown in the drawing, are preferably formed with blunt or rounded bottoms so that when the outer end of a slot is closed there will be an opening in the slot for a fishline. Said blunt bottom construction also spreads bending at the hinge over a considerable surface area to increase fatigue resistance of same. A fishline 3 is shown in the upper slot of the sinker, and the same fishline is shown gripped in place in the narrow blunt bottom of the same slot in Figure 2 where the upper slot has been pinched together with the side members 4 and 5 of the sinker bending bodily about the center or hinge portion 6. The gripping of the sinker onto a fishline is easily accomplished by merely placing the fishline in the slot at desired position and then pinching the shot with the fingers at the opposite sides of said slot to close it as shown in Figure 2. To remove the sinker from the fishline it is only necessary to pinch the sinker on the opposite sides of the open lower slot (Figure 2) which will open the upper slot by pivotal movement about the center hinge portion 6.

The shot type construction for sinkers is not limited to two slots even though that is the normally preferred construction. Figures 4 and 5, for instance, show three and four slots respectively which are operable to grip the fishline in identically the same manner as described in connection with the construction shown in Figures 1 and 2. Figure 6 shows a special form of the Figure 1 construction wherein the ends of the slots are joined, thus giving a construction having a center post type of hinge 6a. With this construction the post portion is preferably of a little larger diameter than the normally used thickness of hinge portion 6 of Figures 1, 4 and 5, since in the latter case the length of same gives a larger body of metal in the hinge to provide a safe and positive holding grip on the fishline.

The same multiple groove construction is adaptable for use on other than the shot type sinkers and one of those constructions is shown in Figure 7 where a cylindrical sinker is shown which has two oppositely directed slots 2 and even though that is the preferred construction, more than two slots can be used without departing from the spirit of the invention, and Figure 7 is to be considered as diagrammatically showing these variations.

Figure 8 shows a further modification of the bar type sinkers wherein a triangular-shaped sinker is provided with three grooves, each of which preferably is placed approximately at about the midpoint of each face and terminates at a point leaving sufficient material for the proper functioning of hinge portion 6.

Various types of metal can be used to make these sinkers and that metal is preferably lead or a lead alloy which has considerable weight, fatigue resistance, and very little, if any, resilience which would cause the slot to tend to spring open after being pinched shut.

The sinkers of the present invention can be made in various ways, such as by forming shot or bar members and then slotting the same. The bar form of the invention can be slotted either before or after cutting the bar members to length. These sinkers, in their various forms, can also be made by pressing, wherein the grooves are produced at the same time the sinker is formed. They can also be cast, and in that case it might be necessary to clean the edges of the slots to avoid sharp edges which would cut the fishline in use, although the necessity of this cleaning may be avoided with precision casting procedures. The bar type can also be made by the extrusion method which would form the bar to size with grooves in place and only leave the cutting of same to suitable length to be done as a further step. It might be necessary to clean up the cut edges of the slots at the ends of the sinker in order to remove burrs, but the necessity of doing this would depend considerably upon the method of holding and cutting the sinkers from the extruded bar.

Other modes of applying the principle of my invention may be employed instead of those explained, change being made as regards the means herein disclosed, provided those stated by any of the following claims or their equivalent be employed.

I therefore particularly point out and distinctly claim as my invention:

1. A weight adapted to attachment to a fishline or the like, comprising a body member having at least two relatively deep elongated V-slots with narrow blunt bottoms therein and wherein the fishing line is received, all of said slots extending toward a substantially common line and with all of the material between the adjacent ends of said slots forming a hinge of less thickness than the maximum depth of at least one of said slots whereby the closing of the outer end of one of said slots with a fish line therein will cause said line to be clamped and will, through said hinge, cause another slot to open wider.

2. A device of the class described comprising a substantially nonresilient, fatigue-resisting, metal sinker having a bendable body with at least two relatively deep, narrow, blunt-bottom V-slots therein with all of said slots extending towards a straight substantially common longitudinally extending line and with all of the metal of the body between the adjacent ends of said slots forming a hinge portion of less thickness than the maximum depth of any of said slots such that the closing of the outer end of one of said slots by bending said sinker about said hinge will open the outer end of another slot.

3. The combination with a fishline of a hand operable substantially nonresilient, fatigue-resisting metal sinker, the body of which has at least two relatively deep, narrow, blunt-bottom V-slots therein and wherein the fishing line is received, all of said slots extending toward a substantially common line and with all of the metal of the body between the adjacent ends of said slots forming a single hinge portion which is of relatively uniform thickness less than the maximum depth of said slots so that when said fishline is placed in one of said slots and said slot closed by bending said sinker about its hinge portion the line will be firmly gripped in that slot while hinge action will cause another slot to be opened wider.

References Cited in the file of this patent

UNITED STATES PATENTS

| | | |
|---|---|---|
| 1,023,676 | Pancoast | Apr. 16, 1912 |
| 1,050,748 | Paulsson | Jan. 14, 1913 |
| 2,106,045 | Zamborsky | Jan. 18, 1938 |
| 2,307,216 | Graham | Jan. 5, 1943 |

FOREIGN PATENTS

| | | |
|---|---|---|
| 634,782 | Germany | Sept. 3, 1936 |

OTHER REFERENCES

William Mills & Son, Fishing Tackle Catalogue No. 130, Copyright 1930. Page 103.